Oct. 6, 1953  W. S. SUTOWSKI  2,654,644
BEARING ASSEMBLY WITH DUST SHIELDS
Filed May 22, 1952

INVENTOR.
WALTER S. SUTOWSKI
BY

Patented Oct. 6, 1953

2,654,644

UNITED STATES PATENT OFFICE 2,654,644

BEARING ASSEMBLY WITH DUST SHIELDS

Walter S. Sutowski, Garfield Heights, Ohio

Application May 22, 1952, Serial No. 289,309

5 Claims. (Cl. 308—187.2)

My invention relates to bearing assemblies incorporating dust shields.

An object of my invention is to provide an improved construction of a bearing assembly wherein dust shields are incorporated with a minimum of mechanical parts.

Another object is the provision of a bearing assembly wherein the dust shields are retained in position by the race members.

Another object is the provision of means for retaining dust shields for a bearing assembly in fixed position and which provides for ready mounting and demounting of the dust shields in position.

Still another object is the provision of an outer race member constructed to hold the bearings of a bearing assembly in a continuous raceway and also to hold dust shields in proper position.

A further object is the provision of an arrangement of parts which provides an efficient dust shield readily mounted in a bearing assembly.

Other objects and a fuller understanding of my invention may be had by referring to the following description and claims, taken in conjunction with the accompanying drawing, in which:

Figure 1:
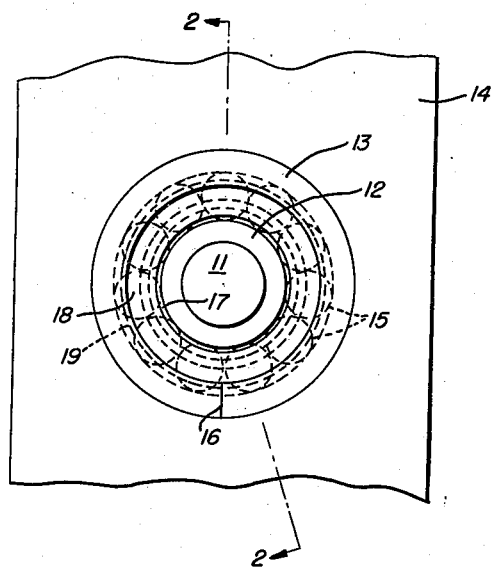
Figure 1 is an elevational view of a bearing assembly embodying my invention mounted in a wall or other structure.

My bearing assembly includes an inner race member 12 and an outer race member 13 with a plurality of ball bearings 15 arranged in a circle and positioned between the race members. A shaft 11 is mounted to the inner race member 12 so as to rotate with the inner race member.

The outer race member 13 is split in an axial direction so as to have the gap or slit 16 extending through the wall of the outer race member 13 and from end to end. The race members are made of an appropriate metal and the outer race member 13 is resilient so as to be somewhat compressible and expandible. Upon compression of the outer race member 13 so as to compress the walls radially inward, the gap or slit 16 is substantially closed to provide a substantially continuous surface of the raceway for the ball bearings. The outer race member may also be slightly resiliently expanded for the purpose of getting the ball bearings 15 in position between the inner and outer race members. When the outer race member is not under compression or tension, the ball bearings are rather loose within the raceway, but upon compression of the outer race member to substantially close the gap 16, then the ball bearings properly fit in the raceway for rolling movement in the usual manner.

To protect the plurality of ball bearings 15 between the race members while the bearing assembly is in use or in service, a dust shield is provided. This dust shield prevents dirt or other foreign material from entering into the space containing the ball bearings in the raceway.

Figure 2:
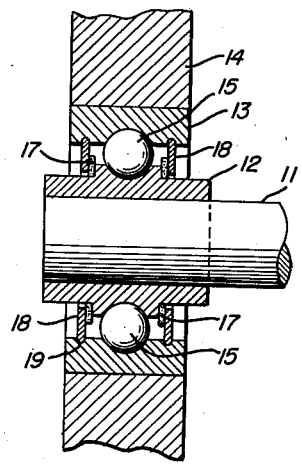
Figure 2 is a cross-sectional view taken through line 2—2 of Figure 1.
Figure 3:
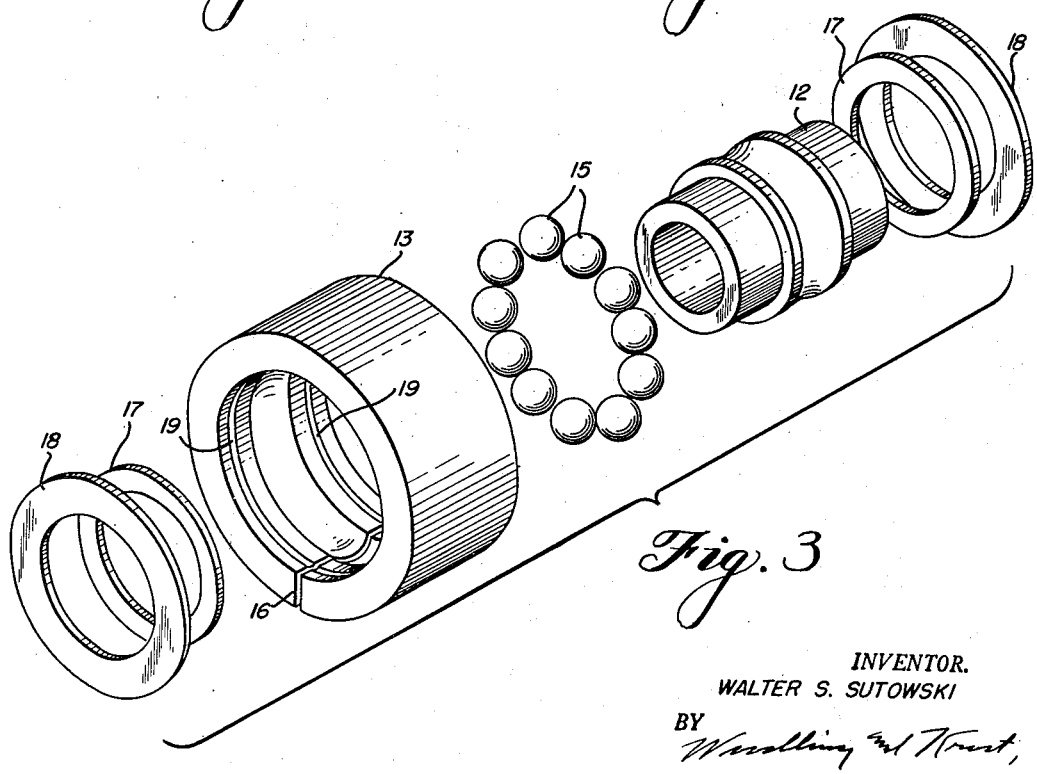
Figure 3 is an exploded view of my bearing assembly with the parts in spaced relationship.

The inner race member 12 has two annular shoulders formed therein, one on each side of the raceway. These annular shoulders extend radially outward from the axis of the race member and are spaced inwardly from the axial ends of the race member 12. Two circular members or rings 17 are provided. One circular member is slid over one end of the inner race member 12 to where it abuts an annular shoulder and the other circular member 17 is slid over the other end of the race member 12 to where it abuts the other annular shoulder. The circular member or rings 17 are preferably made of felt, pressed fiber, soft synthetic fabric, leather or other soft and non-metallic substance. There is sufficient strength and rigidity to the circular members 17 that they tend to extend radially of the race member 12 as shown in Figure 2, but they are also sufficiently pliable and soft as to "give" or yield under pressure.

There are also provided two flat rings or metallic disks 18 with central openings therein. These flat rings 18 are preferably made of metal and are of annular form to conform to the shape and size of the inner wall of the outer race member 13 when in a closed or compressed condition. The outer race member 13 has two annular grooves 19 formed in its inner circumferential surface with each positioned on an opposite side of the raceway for the balls. The grooves 19 are of a size and arrangement that the flat rings 18 may be engaged in the grooves, respectively. The outer peripheral edge portion of each flat ring 18 may fit within a respective groove 19 when the outer race member 13 is in a compressed or closed position.

The arrangement is such that the parts may be readily inserted in place to the disposition shown in the drawing and there held in proper position by the compressed outer race member. In assembly, the ball bearings 15 are first put in position between the raceways, while the outer race member is slightly expanded to provide sufficient space between the race members. The circular members 17 are then moved along the inner race member from its opposite ends to the assembled position shown in Figure 2 wherein the circular members 17 abut the annular shoulders of the inner race member. The metal flat rings 18 are then moved axially inward from the opposite ends of the assembly, while the outer race member is an expanded and uncompressed condition. When the ring members 18 reach the position of the grooves 19, they snap into position and within the grooves 19. The outer peripheral edge portion of the ring members 18 are thus located in the grooves 19, respectively, and the inner peripheral edge portions of the ring members 18 abut the circular members 17 to hold the circular members 17 in position and against the annular shoulder of the inner race member. With the parts thus assembled, the outer race member 13 is compressed to substantially close the gap or slit 16. This causes the outer race member 13 to firmly grip and hold the flat ring members 18 to prevent their axial disengagement. The flat ring members 18 are embraced and held tightly by the compression of the outer race members so that the ring members 18 are firmly held in the respective grooves 19.

With the outer race member 13 compressed, the assembly is then introduced into an opening of a supporting member, such as the wall 14. The inner surface of the opening in the wall 14 is such as to hold the outer race member 13 in tightly compressed condition. The tendency of the outer race member 13 to expand is such as to provide an inter-action between the race member 13 and the wall 14, which tends to hold the assembly firmly in position in the wall 14.

The engagement of the flat metallic ring members 18 and the soft felt, or other soft material, ring members is such that there is a sliding engagement between the circular members 17 and the ring members 18. The ring members 18 carried by the outer race member 13 may freely revolve or remain stationary relative to the circular members 17 carried by the inner race member 12. There is a minimum of frictional resistance between the circular members 17 and the ring members 18, but the contact between them is such that dust or other foreign material is substantially barred from entering the raceway containing the ball bearings 15.

The resilient and split outer race member 13 in its co-action with the other parts is such that the ball bearings 15 are not only held in properly aligned position but the dust shield is also mounted and held in proper arrangement. The parts are disassembled with a maximum of ease by releasing the compression of the outer race member 13 upon removal of the assembly from the wall member. In a wall or other supporting structure, the parts are held in firm position and in correct alignment for efficiency in operation and maximum protection.

The present disclosure includes the description contained in the appended claims, as well as the foregoing description and drawing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. A bearing assembly comprising in combination an inner race member said inner race member having an annular outer channel extending therearound and a pair of annular shoulders extending therearound, said shoulders being positioned on opposite sides of said outer channel and spaced axially from each other, an outer race member having an annular inner channel extending therearound and a pair of inner annular grooves extending therearound, said grooves being positioned on opposite sides of said inner channel, a plurality of round bearings positioned between said race members, said channels facing each other and providing a raceway for said bearings, a pair of metallic ring members positioned between said race members and on opposite sides of said bearings, each of the said ring members having an outer annular edge portion, said edge portions being disposed in said grooves respectively to hold said ring members against axial movement, and a pair of circular members positioned between said race members and on opposite sides of said bearings, each of the said circular members being disposed adjacent said shoulders respectively to limit axial movement of said circular members axially of said inner race member toward said bearings, said circular members being positioned axially between said shoulders and said ring members, respectively, and in sliding engagement with said ring members, respectively, said outer race member being split and resiliently compressible, compression of said outer race member substantially closing said split to form a substantially continuous raceway for said bearings and to hold said ring members in said grooves, said ring members and said circular members providing a dust shield for said bearings between the race members.

2. A bearing assembly comprising an inner race member, an outer race member, a plurality of bearings positioned between said inner and outer race members, said outer race member being split and being resilient for the opening and closing of said split, said outer race member having a pair of grooves formed in the inner circumferential wall thereof and positioned on opposite sides of said bearings, said inner race member having a pair of shoulders formed on the outer circumferential wall thereof and positioned on opposite sides of said bearings, a first pair of perforate disk members surrounding and spaced from said inner race member and having an outer edge portion disposed in said grooves respectively of the outer race member, and a second pair of perforate disk members surrounding and engaging said inner race member and engaging the said shoulders of the inner race member, said second pair of disk members being disposed axially inward of, and in sliding engagement with, said first pair of disk members, respectively, the engaged disk members providing a dust shield for the bearings between the said race members, the said outer race member being compressed to substantially close said split and to hold said first pair of disk members disposed in said grooves.

3. A bearing assembly comprising an inner race member having a raceway and annular shoulders each disposed on opposite sides of said raceway, said shoulders facing the axial ends of said inner race member, a split and resilient outer race member having a raceway and grooves each disposed on opposite sides of said raceway, said grooves opening toward said inner race member, a plurality of bearings positioned in said raceways between said race members, a pair of circular members mounted on said inner race member and adjacent said shoulders, respectively, said shoulders limiting axial movement of said circular members toward said bearings, a pair of ring members mounted within said outer race member and around said inner race member, each ring member having an outer annular edge portion disposed in a respective groove to limit axial movement of said ring members, each ring member having an inner annular edge portion overlapping and slidably engaging a respective circular member, said ring members and circular members enclosing said bearings between the race members, said outer race member in compressed condition to substantially close said split embracing said ring members to hold the same in said grooves.

4. A dust-resistant bearing assembly comprising in combination a split outer race member, an inner race member, a plurality of ball bearings positioned between said race members, and a first pair of annular members having a round opening therein and a second pair of annular members having a round opening therein, said annular members being positioned between said inner and outer race members, the annular members of each pair being positioned on opposite sides of said ball bearings axially of said race members, said outer race member and said inner race member each having annular shoulders disposed in opposite sides of said ball bearings axially of said race members, said first pair of annular members surrounding and being spaced from said inner race member, said first pair of annular members being tightly embraced by said outer race member under compression and engaging the annular shoulders respectively of said outer race member to limit axial movement of said first pair of annular members, said other pair of annular members surrounding said inner race member and being spaced from said outer race member, said other pair of annular members engaging the annular shoulders respectively of said inner race member to limit axial movement of said other pair of annular members, said first pair of annular members being disposed in sliding engagement with, next adjacent, and axially outward of said other pair of annular members to further limit axial movement of said other pair of annular members, said outer race member being compressed to substantially close the said split and to tightly embrace and hold said first pair of annular members, the said pairs of annular members providing a dust-resistant protection to the ball bearings between said race members.

5. A bearing assembly comprising in combination an inner race member, an outer race member, a plurality of bearings positioned between said race members, a pair of substantially flat metallic shield members disposed between said race members and on opposite sides of said bearings axially of said race members, said metallic shield members each having an outer peripheral edge portion adjacent the inner wall of the outer race member, a pair of substantially flat non-metallic fiber-like shield members disposed between said race members and on opposite sides of said bearings axially of said race members, said fiber-like shield members each having an inner peripheral edge portion adjacent the outer wall of the inner race member, said metallic shield members being disposed adjacent and axially outward of said fiber-like shield members, respectively, and in sliding engagement therewith, said inner race member having a pair of shoulders on opposite sides of said bearings axially of said inner race member and abutting the inner peripheral edge portion of said fiber-like shield members to limit axially inward movement thereof toward said bearings, said outer race member having a pair of grooves on opposite sides of said bearings axially of said inner race member and receiving the outer peripheral edge portion of said metallic shield portions to limit axially inward and outward movement thereof relative to said bearings, said outer race member being split and compressible to provide for substantially closing said split and for embracing and holding within the respective grooves the peripheral edge portion of said metallic shield members.

WALTER S. SUTOWSKI.

References Cited in the file of this patent

UNITED STATES PATENTS

| Number | Name | Date |
| --- | --- | --- |
| 845,632 | Gurney | Feb. 26, 1907 |
| 937,811 | Jenkins | Oct. 26, 1909 |
| 2,202,770 | Brodin | May 28, 1940 |